United States Patent [19]

Krause

[11] Patent Number: 5,659,371
[45] Date of Patent: Aug. 19, 1997

[54] METHOD AND APPARATUS FOR POWER SUPPLY STARTUP IN VIDEO MONITORS

[75] Inventor: Peter Krause, Singapore, Singapore

[73] Assignee: Apple Computer, Inc., Cupertino, Calif.

[21] Appl. No.: 505,135

[22] Filed: Jul. 21, 1995

[51] Int. Cl.⁶ ................................................ H04N 5/222
[52] U.S. Cl. .......................... 348/730; 348/173; 345/212; 395/750.01
[58] Field of Search ........................ 348/730, 173, 348/633, 634, 500, 525; 395/250, 325, 500; 345/76, 212; 364/237.3–237.2, 927, 948.4, 943.43, 707; 307/273.3; H04N 5/222

[56] References Cited

U.S. PATENT DOCUMENTS

| | | | |
|---|---|---|---|
| 4,553,166 | 11/1985 | Suttor | 348/730 |
| 5,079,666 | 1/1992 | Najm | 361/85 |
| 5,375,245 | 12/1994 | Sothjell et al. | 395/750 |
| 5,389,952 | 2/1995 | Kikinis | 345/212 |
| 5,481,299 | 1/1996 | Coffey et al. | 348/123 |

Primary Examiner—Glenton B. Burgess
Attorney, Agent, or Firm—Burns, Doane, Swecker & Mathis, L.L.P.

[57] ABSTRACT

Dramatically lower power consumption of a video display to is achieved during standby mode. Using relatively simple sync-energy converting circuitry, the power supply can be switched on/off electronically, without the need to have the main power supply running and without an auxiliary supply. Power consumption of 0 W may thereby be achieved. In accordance with one embodiment of the invention, sync-signal energy is stored in a storage capacitor. During charging, the capacitor is decoupled from any load such that capacitor voltage will reach a peak voltage of the unloaded source signal. Charge and discharge cycles repeat continuously for so long as the power switch is turned off. This charging and discharging allows the display to be turned on using the power switch, even without the momentary presence of AC line voltage. A possible non-retriggable state is avoided using an RC time constant.

6 Claims, 3 Drawing Sheets

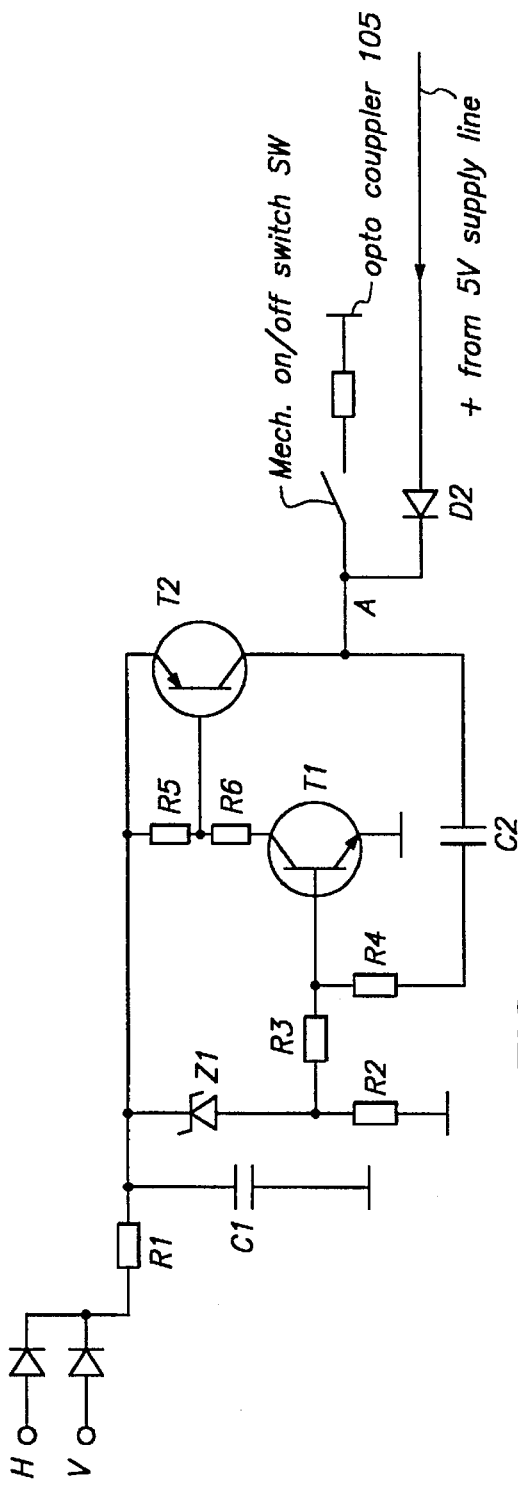
FIG. 2
FIG. 3
FIG. 4

METHOD AND APPARATUS FOR POWER SUPPLY STARTUP IN VIDEO MONITORS

BACKGROUND OF THE INVENTION

1. Field of the Invention

The present invention relates to video display monitors having a low power or sleep mode of operation.

2. State of the Art

Recent studies have concluded that during normal business hours a large percentage of electric power is consumed by computing equipment. The same computing equipment, however, is typically not used on a continuous basis, but rather is used at intervals. Despite this usage at intervals, computing equipment is typically left on continuously during business hours and often around the clock. Such practice wastes energy, since the computing equipment, even though it is not being used, continues to draw a significant amount of power. In view of this situation, the Energy Star regulation has been advanced, which sets forth guidelines for the intelligent conservation of energy by computing equipment.

In a typical small computer, a large share of energy is consumed by the video display monitor. In a typical small system, the CPU may consume about 50 to 80 W, and the display may consume about 80 W (15" display) to 135 W (17" display). Video display monitors therefore offer considerable potential for energy savings. According to the Energy Star regulation, when horizontal and vertical sync signals are not being applied to the video display monitor by the host CPU, the video display monitor should switch off. The power consumption in this mode (standby mode) should be below 15 W, preferably below 5 W.

The most common approach to fulfill the Energy Star regulation is to keep the main power supply running but to switch off all unnecessary supply lines. Usually only a few low-power supply lines will be kept alive during standby mode operation. Because the main power supply is running at very low output power, the efficiency of the supply will drop considerably. Although only 1 or 2 W power is needed, the main power supply may consume between 5 to 10 W.

Another method is to use an auxiliary power supply to control the main power supply. Usually, a simple switching-type regulator is used for this purpose. The cost for such an auxiliary supply may vary depending on the output power and input voltage range, but is not insignificant. Using this arrangement, power consumption during standby operation is in the range of 2 to 4 W.

SUMMARY OF THE INVENTION

The present invention, generally speaking, enables dramatically lower power consumption of a video display to be achieved during standby mode.

Using relatively simple sync-energy converting circuitry, the power supply can be switched on/off electronically, without the need to have the main power supply running and without an auxiliary supply. Power consumption of 0 W may thereby be achieved. In accordance with one embodiment of the invention, sync-signal energy is stored in a storage capacitor. During charging, the capacitor is decoupled from any load such that capacitor voltage will reach a peak voltage of the unloaded source signal. Charge and discharge cycles repeat continuously for so long as the power switch is turned off. This charging and discharging allows the display to be turned on using the power switch, even without the momentary presence of AC line voltage. A possible non-retriggable state is avoided using an RC time constant.

BRIEF DESCRIPTION OF THE DRAWING

The present invention may be further understood from the following description in conjunction with the appended drawing. In the drawing:

FIG. 2 is schematic diagram of one embodiment of the power supply startup circuit of FIG. 1;

FIG. 3 is a waveform diagram of a voltage at the on/off switch of FIG. 1 prior to the application of AC power;

FIG. 4 is a waveform diagram of a voltage at the on/off switch in FIG. 1 following the application of AC power.

DETAILED DESCRIPTION OF THE PREFERRED EMBODIMENTS

Figure 1:
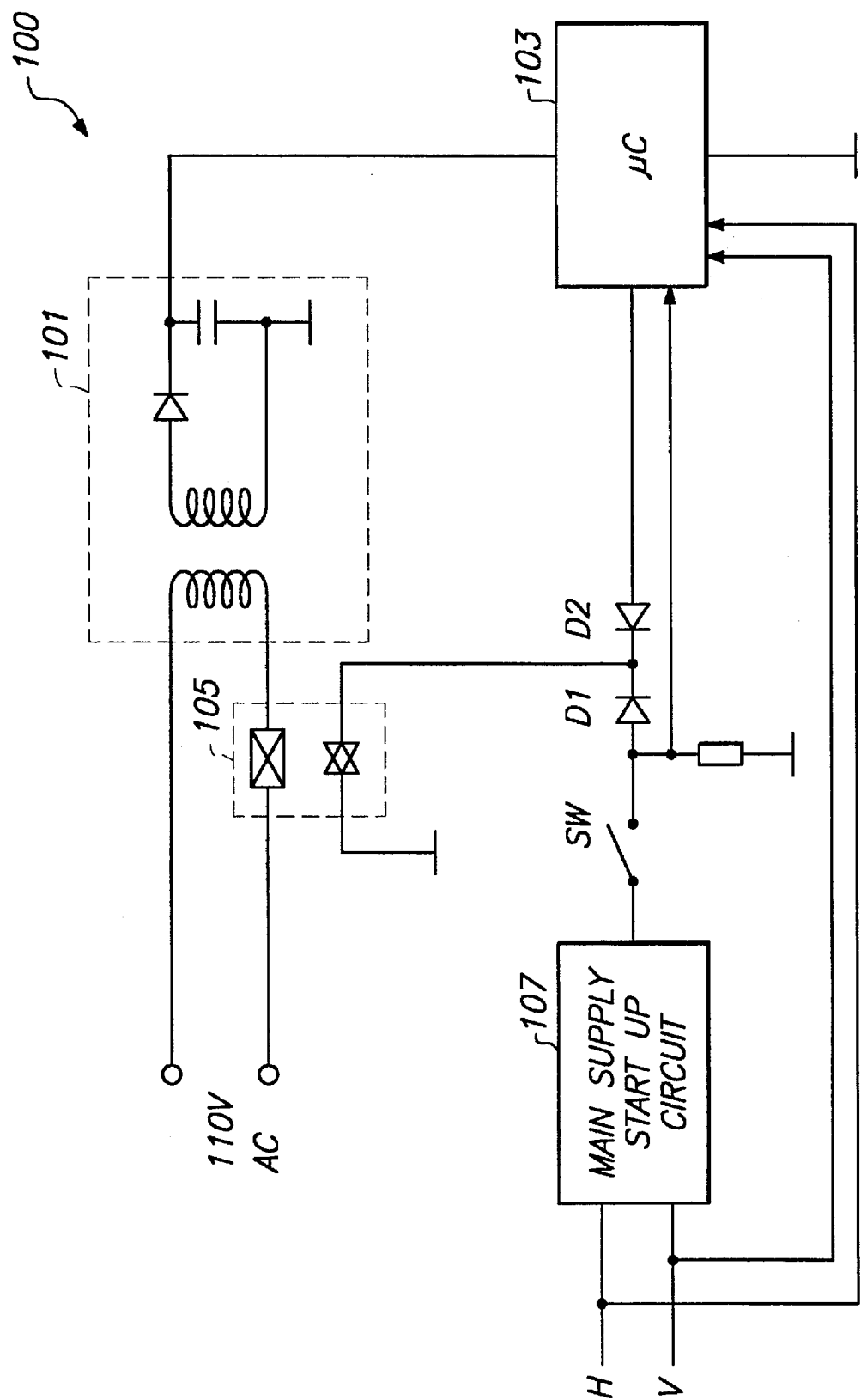
FIG. 1 is a simplified diagram of a power supply circuit of a video display monitor.

Referring to FIG. 1, a power supply circuit 100 of a video display monitor is shown. A 110 V AC line is coupled through a transformer 101 to produce an appropriate supply voltage for application to a microcontroller 103. The microcontroller 103 is connected to horizontal and vertical sync signals H and V. The microcontroller 103 is also connected through a diode D2 to an opto-iso switch 105 connected in the AC line. Assuming that a user-operated power switch SW is closed, when both H and V are inactive for a specified period of time, the microcontroller 103 nevertheless opens the opto-iso switch 105, thereby interrupting power to the video display monitor. No auxiliary power supply is provided. Therefore, in this condition, the video display monitor consumes no power, i.e., 0 W.

When H and/or V later becomes active (assuming again that the switch SW is closed), a means must be available for restoring power to the video display monitor, from which power has previously been entirely cutoff. This function is performed by a main power supply startup circuit 107. The start up circuit 107 is connected through the switch SW and a diode D1 to the opto-iso switch 105 in order to trigger the switch when H and/or V becomes active. The startup circuit 107 derives power from the H and V signals themselves. Once the opto-iso switch 105 has been triggered, power is supplied through the AC line to the microcontroller 103, which powers up and supplies a latching current to the opto-iso switch 105, latching it in the on state. If the switch SW is later opened, this condition is sensed by the microcontroller by means of a resistor R and a sense line 109. The microcontroller 103 then ceases supplying latching current to the opto-iso switch 105, which then opens, disconnecting power from the video monitor.

To start a power supply through an opto-coupler device, a trigger voltage of 2–3 V and a trigger current of at least 10 mA must be provided. Negative going horizontal and vertical synchronization signals generated by the host CPU with a low source impedance are generally able to provide the necessary voltage and current. However, positive signals are not able to provide enough voltage to trigger the switch device. Furthermore, higher impedance negative signal sources may work unreliably. Therefore, the present standby mode power supply circuit converts the sync energy into a supply voltage for the electronic switch that is independent from the duty cycle and impedance of the signal source. This task is accomplished with the circuitry shown in FIG. 2.

Referring to FIG. 2, one embodiment of the main power supply startup circuit 107 is shown. The sync signals H and V are connected through respective diodes and through a resistor R1 (optional) to one plate of a storage capacitor C1. The other plate of the capacitor C1 is grounded. When H and/or V is active, the capacitor C1 charges. A transistor T2 is connected between the positive plate of the capacitor C1 and the switch SW. When the switch SW is closed, the transistor T2 is connected to the opto-iso switch 105. If the switch SW is closed, then when the capacitor C1 reaches a predetermined state of charge, it discharges through the transistor T2 into the opto-iso switch 105 to turn the switch on. If the AC line is not plugged in, then the opt-iso switch 105, although it has been turned on momentarily, will not be latched on, and the video display monitor will not operate. If the AC line is later plugged in, the video display monitor should be expected to operate normally. To provide for this case, a retriggerability feature is provided.

A trigger threshold is set by a Zener diode Z1 connected from the positive plate of the capacitor C1 through a resistor R2 to ground. A resistor R3 is connected from a junction of the Zener diode and the resistor R2 to the base of a transistor T1, the emitter of which is connected to ground. The collector of the transistor T1 is connected through a resistive divider R5, R6 to the positive plate of the capacitor T1. The base of the transistor T2 is connected to a junction between the resistors R5 and R6.

In addition, a series combination of a resistor R4 and a capacitor C2 is connected between the base of the transistor T1 and the collector of the transistor 72.

In operation, if there is an active sync signs. 1, the storage capacitor C1 will be charged (as there is virtually no leakage current) according to $Vc=V(1-\exp(-t/T))$ where $T=RC$. After the capacitor voltage has crossed a threshold level of the Zener diode Z1, which marks the completion of the C1 charging process, the transistor T1 will be forward biased through the resistor R3. This forward bias of the transistor T1 provides, through the resistor R6, base current for the transistor T2. To keep the transistors T1 and 72 turned on at a charge voltage below the threshold voltage of Z1 so as to allow load current to flow into the opto-coupler device, positive feedback is provided through the capacitor C2 and the resistor R4.

After completion of the charge cycle, the transistor T1 will become non-conductive. Hence the transistor T2 will be off and the storage capacitor C1 will be decoupled from its load. This condition allows the capacitor voltage to rise again without the impact of load current. Independent from the source signal's duty cycle, the storage capacitor voltage will reach the peak voltage of the unloaded input sync signal.

As shown in FIG. 3, which plots the voltage at node A in FIG. 2, after crossing the threshold voltage of Z1, a new cycle of providing the load current to the opto switch will be triggered. This manner of operation will continue until the main power supply has been successfully switched on, in which case the opto-iso switch 105 will be latched by the set internal supply voltage. At that time, as shown in FIG. 4, the circuitry becomes virtually inactive due to an equilibrium of load voltage and storage capacitor voltage.

The foregoing description has assumed that the sync lines are asserted high such that in the absence of sync signals the lines remain at ground (logic low). "No sync," however, does not necessary mean low-level steady state for the sync lines, but could instead mean high level. The foregoing design obviously would not switch the power off if a constant high state were present on one or both sync lines.

Figure 5:
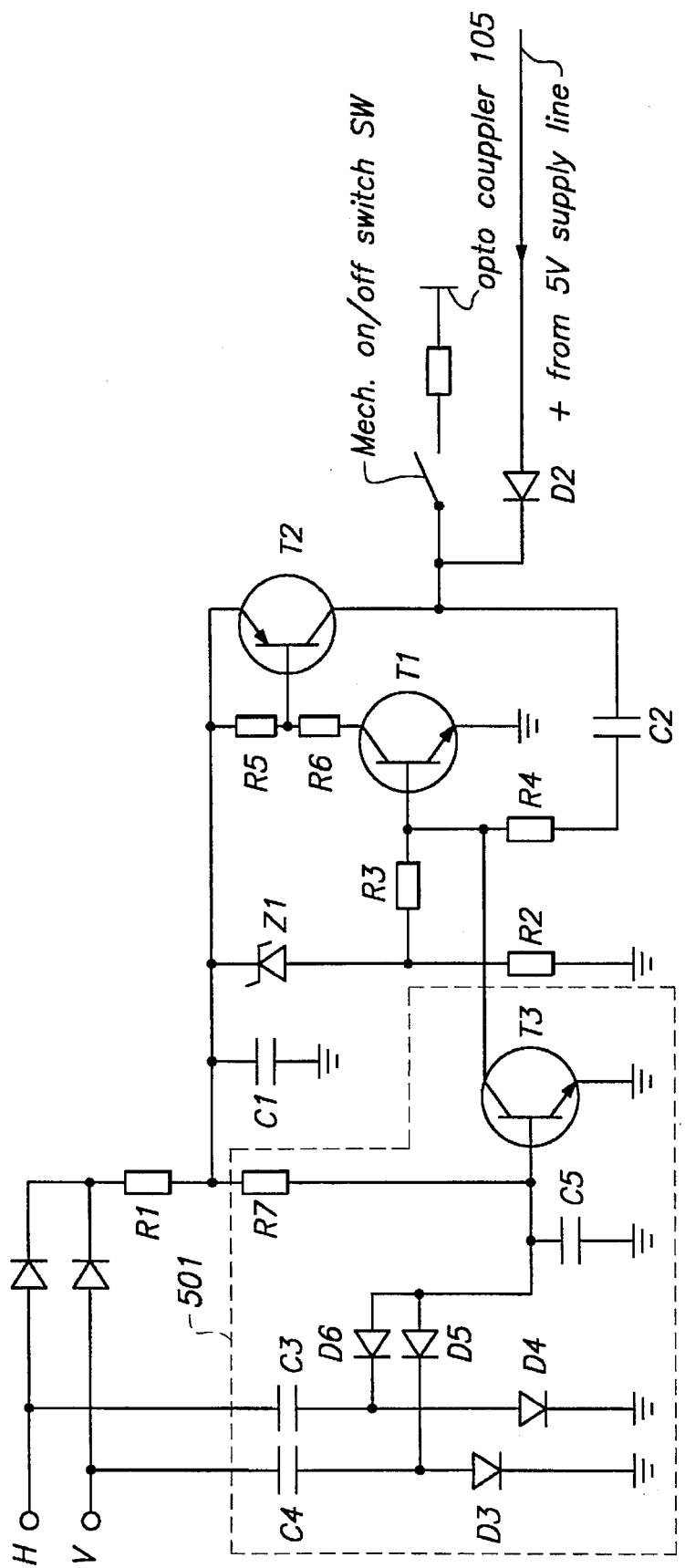
FIG. 5 is a schematic diagram of another embodiment of the power supply startup circuit of FIG. 1.

To provide for this situation, in the circuit shown in FIG. 5, another stage 301 has been added to the circuit of FIG. 2.

The additional stage 501 makes the sync startup circuitry previously described in relation to FIG. 2 non-functional if no sync signal is present. To be considered valid, sync signals need to be pulses with a minimum frequency of at least 20 Hz in the case of vertical sync and at least 20 KHz in the case of horizontal sync.

The additional stage 501 includes a transistor T3 the emitter of which is connected to ground and the collector of which is connected to the base of the transistor T1. The base of the transistor T3 is connected through a resistor R7 to the positive plate of the storage capacitor and through a capacitor C5 to ground.

Each of the sync signals is connected to a positive plate of the capacitor C5 through a network including a capacitor (C4, C5) a first diode (D3, D4) connected from the capacitor to ground, and a second diode (D5, D6) connected to a junction between the capacitor and the first diode so as to conduct current away from the capacitor C5.

In operation, the horizontal and vertical sync pulses will be clamped at a positive level of 0.65 V through C4 and D2 and C3 and D1 respectively. After rectification by the diodes D5 and D6, these signals will generate a negative voltage across the capacitor C5. This negative voltage in turn will bring the transistor T3 into a non-conductive state. In this condition, the sync startup circuitry will work as described before, meaning it will switch on the set. However if there are no H or V sync pulses, no negative voltage across the capacitor C5 will be generated, and the transistor T3 will becomes conductive (through the action of a base current provided by the resistor R7). The transistor T3, in the conductive state, will hence disable the sync startup circuitry if a positive steady state level is present.

In the foregoing manner, the power supply can be switched on and off electronically, without the need to have the main power supply running and without an auxiliary supply. As opposed to a few watts power consumption during stand by mode characteristic of the prior art, the present invention allows power consumption to be reduced to zero.

It will be apparent to those of ordinary skill in the art that the invention can be embodied in other specific forms without departing from the spirit or essential character thereof. The disclosed embodiments are therefore considered in all respects to be illustrative and not restrictive. The scope of the invention is indicated by the appended claims, and all changes and modifications which come within the meaning and range of equivalents thereof are intended to be embraced therein.

What is claimed is:

1. For use in a video monitor, an apparatus comprising:
   a main power supply line;
   an electronic switch connected so as to open said main power supply line in accordance with an open state of said electronic switch and to close said main power supply line in accordance with a closed state of said electronic switch;
   a synchronization signal line carrying a synchronization signal which, when active, comprises periodic pulses;
   a start-up circuit coupled to said electronic switch, said start-up circuit comprising:
   a capacitor coupled to said synchronization line, said capacitor being charged by said synchronization line when said synchronization signal is active; and
   means for triggering discharge of said capacitor so as to close said electronic switch.

2. The apparatus of claim 1, wherein said means for discharging periodically discharges said capacitor so as to close said electronic switch.

3. The apparatus of claim 2, further comprising a low voltage power supply line connected to said startup circuit and to said electronic switch, said low voltage power supply line being operative while said electronic switch is closed.

4. The apparatus of claim 3, wherein said low voltage power supply line, when operative, prevents discharging of said capacitor by said means for discharging.

5. The apparatus of claim 3, further comprising:

a mechanical switch coupling said start-up circuit to said electronic switch;

means for detecting when said mechanical switch is open; and means for rendering said low voltage power supply line non-operative when said mechanical switch is open.

6. The apparatus of claim 1, further comprising:

means for detecting the absence of said synchronization signal; and means for preventing discharging of said capacitor by said means for discharging in the absence of said synchronization signal.

* * * * *